（12) United States Patent
Moreau et al.

(10) Patent No.: US 8,876,053 B2
(45) Date of Patent: Nov. 4, 2014

(54) FUSELAGE ELEMENT COMPRISING A FUSELAGE SEGMENT AND JUNCTION MEANS, FUSELAGE PORTION, FUSELAGE AND AIRCRAFT

(75) Inventors: Dominique Moreau, Aucamville (FR); Cedric Meyer, Fonsorbes (FR); Jocelyn Gaudin, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 20 days.

(21) Appl. No.: 13/381,579

(22) PCT Filed: Jul. 2, 2010

(86) PCT No.: PCT/FR2010/000488
§ 371 (c)(1),
(2), (4) Date: Dec. 29, 2011

(87) PCT Pub. No.: WO2011/001049
PCT Pub. Date: Jan. 6, 2011

(65) Prior Publication Data
US 2012/0104167 A1 May 3, 2012

(30) Foreign Application Priority Data
Jul. 3, 2009 (FR) .................... 09 54625

(51) Int. Cl.
*B64C 1/00* (2006.01)
*B64C 1/06* (2006.01)
*B64C 1/12* (2006.01)

(52) U.S. Cl.
CPC ............. *B64C 1/064* (2013.01); *B64C 1/069* (2013.01); *B64C 1/12* (2013.01); *B64C 2001/0081* (2013.01)
USPC ........................................ 244/131

(58) Field of Classification Search
USPC ........... 244/120, 119, 117 R, 123.1, 124, 132
See application file for complete search history.

(56) References Cited

U.S. PATENT DOCUMENTS

| 5,518,208 | A  | * | 5/1996  | Roseburg ........................ 244/132 |
| 7,159,822 | B2 | * | 1/2007  | Grantham et al. ............. 244/119 |
| 7,555,873 | B2 | * | 7/2009  | Kilwin et al. ................... 52/838 |
| 7,823,362 | B2 | * | 11/2010 | Meyer ............................. 52/713 |
| 8,016,236 | B2 | * | 9/2011  | Grieve et al. ................... 244/131 |
| 8,302,909 | B2 | * | 11/2012 | Cazeneuve et al. ........... 244/120 |

(Continued)

FOREIGN PATENT DOCUMENTS

| FR | 2 906 008 | 3/2008 |
| FR | 2 922 518 | 4/2009 |

OTHER PUBLICATIONS

International Search Report issued on Oct. 15, 2010 in PCT/FR10/000488 filed on Jul. 2, 2010.

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

A fuselage element including a first fuselage segment including a skin, and a junction device for connecting the first segment to a second adjacent fuselage segment is disclosed. The first segment extending along the longitudinal axis of the fuselage element includes stiffening elements extending along the axis. The end of at least one stiffening element extends beyond a free edge of the skin by a predetermined length.

11 Claims, 3 Drawing Sheets

(56) References Cited

U.S. PATENT DOCUMENTS

2006/0060705 A1* 3/2006 Stulc et al. .................. 244/119
2008/0067289 A1  3/2008 Meyer
2010/0258676 A1* 10/2010 Gauthie et al. ............... 244/131

* cited by examiner

FUSELAGE ELEMENT COMPRISING A FUSELAGE SEGMENT AND JUNCTION MEANS, FUSELAGE PORTION, FUSELAGE AND AIRCRAFT

BACKGROUND OF THE INVENTION

1. Field of the Invention

This invention relates to a fuselage element, as well as to a fuselage portion comprising such an element and an adjacent section.

More particularly, it relates to a fuselage element comprising a fuselage section and junction means able to connect the fuselage section to an adjacent section.

2. Brief Summary of the Invention

The fuselage of an aircraft comprises in particular a skin and stiffener elements for this skin. The stiffener elements are arranged either in a longitudinal direction (known as stringers), or in a plane transverse to the axis of the fuselage (known as frames).

The fuselage generally comprises several fuselage sections assembled with each other. These fuselage sections are assembled by means of junctions. The purpose of the junctions is in particular to transfer mechanical loads between adjacent sections, in particular longitudinal stresses.

In general, the fuselage, as well as the junctions, has a cylindrical shape, although other shapes may be considered.

There are junctions that are designed so as to ensure the continuity of the stringers. The document FR 2 910 874 describes junctions designed in this way.

These junctions comprise mechanical junction elements such as a ferrule and stringer joint plates. The ferrule makes it possible to connect the skins of the two adjacent sections and the stringer joint plates make it possible to connect the stringers or longitudinal stiffeners.

An example of such a design is shown on FIG. 1. This Figure shows a part of two adjacent fuselage sections 2a, 2b. The fuselage has a cylindrical shape and comprises a skin 30, as well as stringers 50 situated in a longitudinal plane. A cylindrical junction 40 is arranged between these two cylindrical fuselage sections 2a, 2b at frame 80. This junction 40 comprises a ferrule 70, situated on the inner surface of skin 30 of the fuselage and connecting skins 30 of the two sections 2a, 2b, as well as stringer joint plates 90 situated respectively on stringers 50 and connecting stringers 50 of the two sections 2a, 2b.

When the stresses to be transmitted between fuselage sections 2a, 2b are high (typically, greater than 600 N/mm), the use of stringer joint plates 90 is necessary.

Nonetheless, the installation of stringer joint plates in the junction element poses problems of fitting of the various elements. Thus, positioning tolerances of the various elements of the junction may become evident. For example, when the stringers of two fuselage sections are not precisely opposite one another, the use of shims between the stringers and the stringer joint plates may be necessary.

Moreover, the installation of stringer joint plates requires an access to the junction element of the interior of the fuselage. This makes automation of assembly of the sections difficult. Consequently, assembly time is considerable.

BRIEF SUMMARY OF THE INVENTION

This invention has the purpose of resolving the aforesaid drawbacks and proposing a fuselage element comprising a fuselage section and junction means between this section and an adjacent section, having a good stability at the junction between the sections, while minimizing the complexity of the assembly.

To this end, this invention applies to a fuselage element comprising a fuselage section comprising a skin, and junction means able to connect the said section to an adjacent section, the said section extending along the longitudinal axis of the fuselage, the fuselage element comprising stiffener elements extending along the said axis, characterized in that the end of at least one stiffener element extends beyond a free edge of the said skin by a predetermined length.

In this way, the presence of stringer joint plates is not necessary, since certain stiffeners allow the transmission of stresses directly onto the adjacent section.

In addition, in the absence of a joint plate, the relative positioning differences between the stringers of one section and of the adjacent section do not pose any problem.

Moreover, access to the interior of the fuselage after assembly of the sections no longer is necessary, and automation is simpler to implement.

According to a second aspect, this invention applies to a fuselage portion comprising a fuselage element as described above and a second fuselage section adjacent to the first fuselage section and extending along the longitudinal axis of the fuselage, the skin of the second fuselage section being connected to the skin of the first fuselage section of the fuselage element, the second fuselage section comprising stiffener elements extending along the axis over more or less the entire length of the second fuselage section and being arranged with an angular offset around the longitudinal axis in relation to the said at least one stiffener element of the first fuselage section extending beyond the free edge of the skin of the first fuselage section.

In this way, the stresses pass from the stringers of the first fuselage section to the stringers of the second fuselage section, and vice versa. This limits the stresses to be passed from the skin of one section to the skin of the other section.

Consequently, since the skin is less acted upon, the thickness can be less than in the prior art, thus minimizing the increase in mass.

Moreover, by virtue of the angular offset of the stiffener elements of the second fuselage section in relation to the stiffener elements of the first fuselage section, there is no problem of arrangement of the said at least one stiffener element projecting out of the first fuselage section during assembly of the sections.

According to one contemplated solution, the stiffener elements of the first fuselage section extend beyond the free edge of the skin of the first fuselage section and the stiffener elements of the second fuselage section extend beyond the free edge of the skin of the second fuselage section, each stiffener of the first fuselage section being inserted between two stiffeners of the second fuselage section.

According to one embodiment, the fuselage sections comprise at least a first portion situated at the end of the junction means having a skin thickness greater than the thickness of the skin of a second portion situated at the center of the said fuselage sections.

By virtue of its allowances at the junction means, the skin is reinforced locally, being more stable during passage of the stresses from one section to the adjacent section.

These allowances are less than those of the prior art by virtue of the extension of the longitudinal stiffeners beyond the free edge of the skin of the first section.

It further may be provided that the junction means of the stiffener element comprise a ferrule able to connect the skin of the first fuselage section and of the second adjacent fuselage section.

In this way, the skin at the junction means is all the more reinforced, and consequently the junction between sections is all the more stable.

Furthermore, the junction means may comprise a second stiffener element of the fuselage (hereinafter referred to as frame) comprising a body extending in a plane transverse to the longitudinal axis of the fuselage, and a base plate extending along the longitudinal axis of the fuselage.

In one embodiment, the ferrule is arranged on the outer surface of the skin and the said base plate is fastened onto the inner surface of the skin of the first portion of the said first fuselage section.

By virtue of the second stiffener element, the junction is even more stable.

In another embodiment, a second stiffener element of the fuselage comprises a body extending in a plane transverse to the longitudinal axis of the fuselage, the fuselage element comprises a ring part extending from the skin to the longitudinal axis of the fuselage, in a plane transverse to the said longitudinal axis of the fuselage, adapted for fastening the said body of the said second stiffener element.

In this embodiment the second stiffener element has no cut-outs for passing the stiffener elements extending beyond the free edge of the skin of the first section.

This avoids the presence of possible instabilities in the second stiffener element.

According to a third aspect, this invention applies to an aircraft fuselage comprising at least one fuselage portion in accordance with the invention.

According to a fourth aspect, this invention applies to an aircraft comprising a fuselage in accordance with the invention.

This fuselage portion, this aircraft fuselage and this aircraft have characteristics and advantages similar to those described above with reference to the fuselage element.

Other features and advantages of the invention also will become apparent in the description below.

BRIEF DESCRIPTION OF THE DRAWINGS

On the attached drawings, provided by way of non-limitative examples.

DETAILED DESCRIPTION OF THE INVENTION

Figure 1:
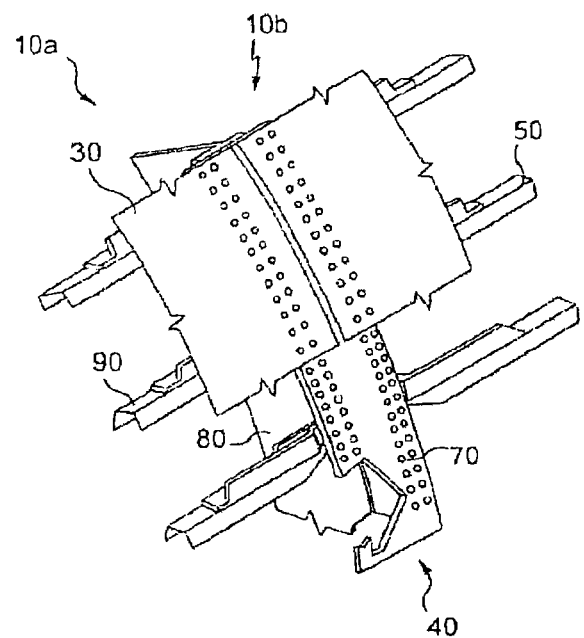
FIG. 1 is a diagram illustrating a fuselage element part connected to a second fuselage element belonging to the prior art.
Figure 2:
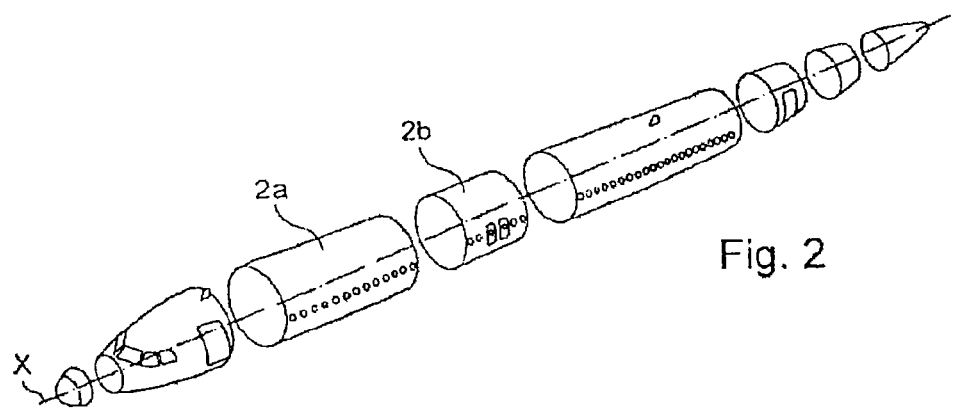
FIG. 2 is a diagram illustrating fuselage sections of an aircraft.

FIG. 2 shows several fuselage sections 2a, 2b.

These fuselage sections 2a, 2b are assembled with each other so as to form the fuselage of an aircraft. Two fuselage sections 2a, 2b are assembled by junction means (not shown on FIG. 2) as will be described below.

The fuselage sections extend along a longitudinal axis X.

Here, the shape of the fuselage sections is cylindrical, and consequently the junction means have the same shape (or are adapted to this shape).

Nevertheless, the fuselage sections, as well as the junction means, may have different shapes.

Next, a first embodiment of a fuselage element in accordance with the invention is going to be described with reference to FIG. 3.

Figure 3:
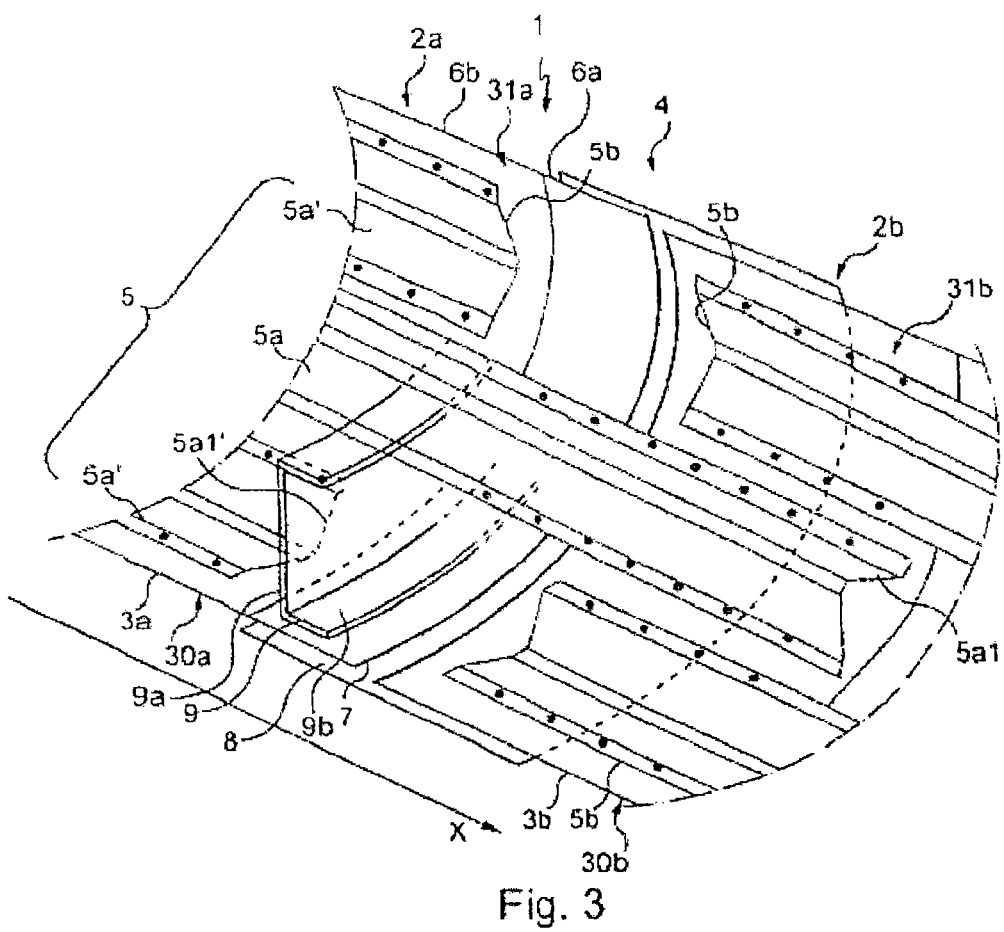
FIG. 3 is a diagram illustrating a fuselage element part connected to a second fuselage element according to a first embodiment in accordance with the invention.

FIG. 3 shows a part of a fuselage element 1 seen from the interior of the fuselage.

Fuselage element 1 comprises a first fuselage section 2a and junction means 4 able to connect first section 2a to a second adjacent section 2b.

A part of each section 2a, 2b is shown here.

Thus, only one end of each section 2a, 2b is shown.

In this example, junction means 4 comprise a ferrule 8 which is adapted for connecting skins 3a, 3b of each section 2a, 2b.

Here, ferrule 8 is arranged on outer surface 30a, 30b of skin 3a, 3b of fuselage sections 2a, 2b. Nevertheless, as a variant, ferrule 8 may be arranged on inner surface 31a, 31b of skin 3a, 3b.

Fuselage sections 2a, 2b comprise stiffeners that extend in longitudinal planes or stringers 5, and stiffeners that extend in transverse planes or frames 9.

Here, frame 9 is situated at junction means 4. It is shown partially so as to leave the other elements of FIG. 3 visible.

Frame 9 comprises a body 9a extending in a plane transverse to longitudinal axis X of the fuselage, and a base plate 9b extending along a longitudinal axis X of the fuselage.

In this embodiment, the base plate rests on inner surface 31a of skin 3a of first fuselage section 2a.

In this embodiment, end 5a1 of at least one stiffener element 5a of first section 2a extends beyond the circumference situated at the end of skin 3a of first fuselage section 2a or free edge 7.

In this way, end 5a1 of this at least one stiffener element 5a is offset longitudinally in relation to end 5a1' of the other stiffener elements of the same section 2a.

Consequently, a portion of this stiffener element 5a thus is situated at second fuselage section 2b. Stiffener element 5a extends beyond free edge 7 of skin 3a of first fuselage section 2a by a predetermined length L.

By way of example in no way limitative, this predetermined length L may have values belonging to a bracket of values from 300 mm to 600 mm.

Of course, these values for predetermined length L may be different, in particular according to the size and the type of fuselage.

It is noted that frame 9 has cut-outs to allow passage of stiffener element 5a.

In one embodiment, first section 2a comprises stringers 5a', the end 5a1' of which does not extend beyond free edge 7 of first section 2a, and stringers 5a the end 5a1 of which extends beyond free edge 7 of first section 2a, in identical number.

In one embodiment, a stringer 5a the end 5a1 of which extends beyond free edge 7 and a stringer 5a' the end 5a1' of which does not extend beyond the free edge are arranged alternately along the circumference of skin 3a of first section 2a.

In other embodiments, a set of stringers 5a the end 5a1 of which extends beyond free edge 7 are arranged consecutively along the circumference of skin 3a of first section 2a. The same is true for a set of stringers 5a' the end 5a1' of which does not extend beyond free edge 7.

In this way, sets formed by several stringers of the same type 5a, 5a' are arranged alternately with each other along the circumference of skin 3a of first section 2a.

For example, each set may contain a single stringer. Thus, a stringer 5a extending beyond free edge 7 and a stringer 5a' not extending beyond free edge 7 are arranged alternately with one another.

Nevertheless, the number of stringers, in each set, may be greater than 1, for example 2 or more.

It is possible that in certain embodiments there is only one set comprising stringers 5a extending beyond free edge 7 and only one set comprising stringers 5a' not extending beyond free edge 7.

The number of stringers 5a extending beyond free edge 7 and stringers 5a' not extending beyond the free edge may be different. For example, the number of stringers 5a extending beyond free edge 7 has a value of at least 10% of the number of stringers 5a' not extending beyond free edge 7.

In general, first section 2a and second adjacent section 2b are similar. Thus, second adjacent section 2b also comprises stiffener elements 5b extending along longitudinal axis X.

When the two sections 2a, 2b are assembled, stringers 5b of second section 2b are arranged with an angular offset around longitudinal axis X in relation to stringers 5a of first section 2a extending beyond free edge 7 of skin 3a of first section 2a.

In another embodiment, all stringers 5a, 5b of the two fuselage sections 2a, 2b extend beyond free edges 7 of respective sections 2a, 2b.

In this way, when the two sections 2a, 2b are assembled, stringers 5a of first section 2a are inserted between two stringers 5b of second fuselage section 2b, and are arranged with an angular offset around longitudinal axis X with each other.

In this way, stresses are transmitted between the stringers of first and second fuselage sections 2a, 2b, limiting the stresses to be passed between the skins of section 2a and 2b.

By way of example in no way limitative, the angular offset around longitudinal axis X between a consecutive stringer 5a of first section 2a and a stringer 5b of second section 2b has a value belonging to a bracket of values between 5° and 20°, and more particularly between 5° and 10°.

The value of the offset between two consecutive stringers 5a, 5b belonging respectively to first section 2a and second section 2b, expressed in circumference length belongs, for example, to a bracket of values between 130 mm and 200 mm.

In one embodiment, a circular section 6a of skin 3a of first fuselage section 2a situated at the end of section 2a (at junction means 4) has a skin thickness greater than the skin thickness of a second section 6b situated at the center of fuselage section 2a.

In this way, the skin is reinforced locally, which makes the junction between the two fuselage sections 2a, 2b even more stable.

Figure 4:
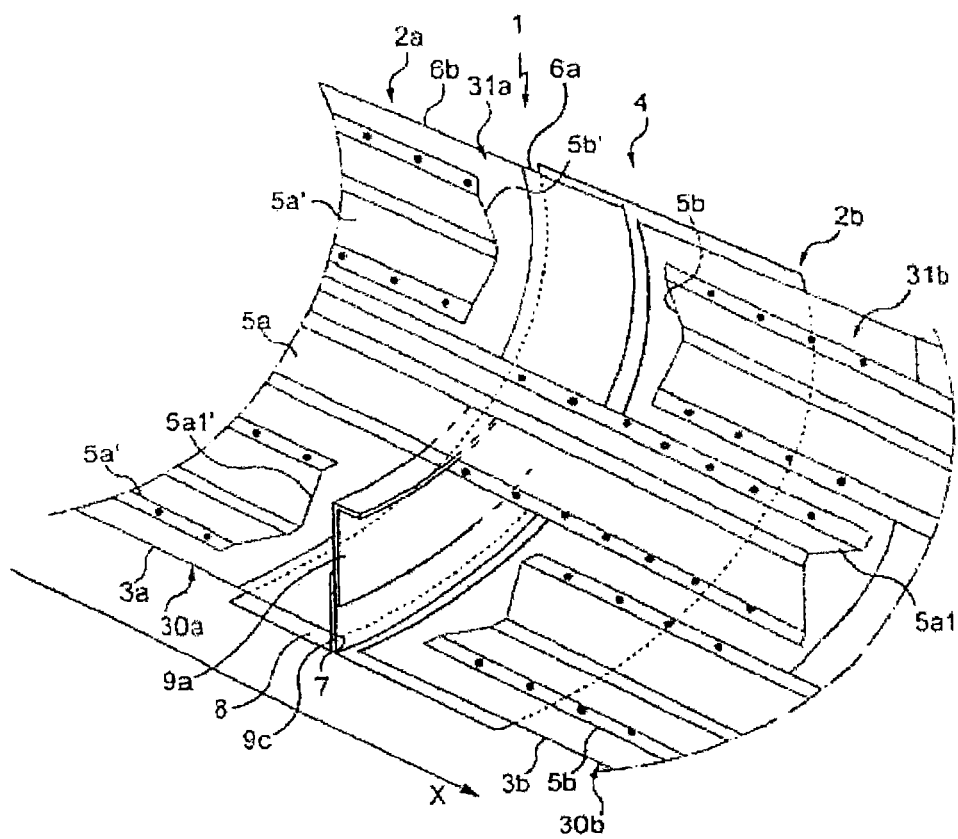
FIG. 4 is a diagram illustrating a fuselage element part connected to a second fuselage element according to a second embodiment in accordance with the invention.

Another embodiment in accordance with the invention is going to be described with reference to FIG. 4.

This embodiment is similar to the embodiment described with reference to FIG. 3.

Thus, the elements in common will not be described here.

In this embodiment, fuselage element 1 comprises a ring (shown partially on FIG. 4), for example, made in one piece with ferrule 8. Ring 9c extends in a plane transverse to longitudinal axis X of the fuselage to the interior of the fuselage, that is to say from skin 3a, 3b to axis X of the fuselage.

This ring 9c is adapted for fastening body 9a of frame 9 and extends over certain parts of the circumference of the fuselage so as to implement a passage for projecting stiffener elements 5a.

Consequently, the junction of sections 2a, 2b is all the more stable because the frame has no cut-outs for passing stringers 5a extending beyond free edge 7 of skin 3a of first section 2a.

In another example, ring 9c could be an element independent of ferrule 8 and rest, for example, on skin 3a, 3b of a fuselage section 2a, 2b.

Thus, by virtue of the invention, it is possible to assemble two adjacent fuselage sections by way of junction means that enable a good stability.

Moreover, assembly complexity is minimized and assembly automation is simpler to use.

Of course, many modifications may be made to the exemplary embodiment described above without departing from the context of the invention.

Thus, for example, as already indicated, the fuselage shapes may be different.

The invention claimed is:

1. A fuselage element of a fuselage comprising:
a first fuselage section including a skin and extending along a longitudinal axis of the fuselage; and
a junction device which connects said first fuselage section to a second adjacent fuselage section; and
stiffener elements extending along said longitudinal axis and being directly attached to and abutting an inner surface of said skin of said first fuselage section,
wherein a first end of at least one stiffener element longitudinally extends beyond a free edge of said skin of said first fuselage section by a predetermined length, and
wherein the at least one stiffener element includes a first section directly attached to said inner surface of said skin of said first fuselage section, and a second section disposed at a different elevation than the first section with respect to said inner surface of said skin of said first fuselage section.

2. A fuselage portion, comprising:
a fuselage element in accordance with claim 1; and
a second fuselage section adjacent to the first section and extending along the longitudinal axis of the fuselage, a skin of said second fuselage section being connected to the skin of said first fuselage section of said fuselage element, said second fuselage section comprising stiffener elements extending along said longitudinal axis over more or less an entire length of the second fuselage section and being arranged with an angular offset around the longitudinal axis in relation to said at least one stiffener element of the first fuselage section extending beyond the free edge of the skin of the first fuselage section.

3. The fuselage portion in accordance with claim 2, wherein the stiffener elements of said first fuselage section extend beyond the free edge of the skin of the first fuselage section and the stiffener elements of said second fuselage section extend beyond a free edge of the skin of the second fuselage section, each stiffener of the first fuselage section being inserted between two stiffeners of the second fuselage section.

4. The fuselage portion in accordance with claim 2, wherein said fuselage sections comprise at least a first portion situated at an end at the junction device having a thickness of skin greater than a thickness of the skin of a second portion situated at a center of said fuselage sections.

5. The fuselage portion in accordance with claim 2, wherein the junction device comprises a second stiffener element of the fuselage comprising a body extending in a plane transverse to the longitudinal axis of the fuselage, and a base plate extending along the longitudinal axis of the fuselage.

6. The fuselage portion in accordance with claim 2, wherein said junction device of said fuselage element comprises a ferrule which connects the skins of the first fuselage section and of the second adjacent fuselage section.

7. The fuselage portion in accordance with claim 6, wherein the junction device comprises a second stiffener element of the fuselage comprising a body extending in a plane transverse to the longitudinal axis of the fuselage, and a base plate extending along the longitudinal axis of the fuselage.

8. The fuselage portion in accordance with claim 7, wherein said ferrule is arranged on an outer surface of the skin and said base plate is fastened onto the inner surface of the skin of said first fuselage section.

9. The fuselage portion in accordance with claim 2, wherein a second stiffener element of the fuselage comprises a body extending in a plane transverse to the longitudinal axis of the fuselage, the fuselage element comprises a ring part extending from the skin of the first fuselage section to the longitudinal axis of the fuselage, in a plane transverse to the longitudinal axis of the fuselage, adapted for fastening said body of said second stiffener element.

10. An aircraft fuselage comprising at least one fuselage portion in accordance with claim 2.

11. An aircraft comprising a fuselage according to claim 9.

* * * * *